United States Patent [19]

Bryan

[11] Patent Number: 5,307,392
[45] Date of Patent: Apr. 26, 1994

[54] ENERGY DISSIPATING OUTER STRIP FOR GRID

[75] Inventor: William J. Bryan, Granby, Conn.

[73] Assignee: Combustion Engineering, Inc., Windsor, Conn.

[21] Appl. No.: 905,754

[22] Filed: Jun. 29, 1992

[51] Int. Cl.⁵ .............................................. G21C 3/34
[52] U.S. Cl. .................................... 376/442; 376/439; 376/448
[58] Field of Search ................ 376/438, 439, 442, 448

[56] References Cited

U.S. PATENT DOCUMENTS

| | | | |
|---|---|---|---|
| 3,751,335 | 8/1973 | Keith | 376/442 |
| 4,544,522 | 10/1985 | Curulla et al. | 376/442 |
| 4,740,350 | 4/1988 | Taleyarkhan | 376/438 |
| 4,765,949 | 8/1988 | Denizou et al. | 376/439 |
| 4,897,241 | 1/1990 | Anthony | 376/438 |
| 5,089,220 | 2/1992 | Nylund | 376/439 |
| 5,104,609 | 4/1992 | Okuyama et al. | 376/442 |

Primary Examiner—Daniel D. Wasil
Attorney, Agent, or Firm—L. James Ristas; John H. Mulholland

[57] ABSTRACT

The grids (14) of a nuclear fuel assembly (10) include an outer strip, or perimeter plate (100), having outwardly projecting formations (104,106) spaced from the side edges (110) of the internal grid strips (108), for resiliently absorbing lateral forces before such forces are transferred directly to the internal strips. The load dissipating feature of the present invention can be enhanced by providing orifices (552) in the substantially flat, central region (502) of each perimeter plate. This produces an hydraulic damping effect that can be pre-established by selecting the orifice sizes for a given set of impact load conditions.

14 Claims, 6 Drawing Sheets

ENERGY DISSIPATING OUTER STRIP FOR GRID

BACKGROUND OF THE INVENTION

The present invention relates to nuclear fuel assemblies, and more particularly, to lateral load-resistant grids for supporting fuel rods within nuclear fuel assemblies of light water nuclear reactors.

U.S. Pat. No. 4,897,241 issued Jan. 30, 1990 to Anthony, entitled "Anti-Bow Grid For Nuclear Fuel Assembly", discloses an improved grid having a plurality of externally projecting, integrally formed anti-bowing springs spaced about the grid perimeter plate, for interacting with flat surfaces on opposed grids of adjacent fuel assemblies in the reactor core. The anti-bowing springs are horizontally separated along each grid in periodic alternation with substantially flat portions of the perimeter plate. Preferably, each grid has a plurality of primary anti-bowing springs that project a distance at least equal to the nominal gap between assemblies, and a plurality of secondary anti-bowing springs that are stiffer but project less than the primary springs. Further, back-up springs may optionally be provided. The interaction of each grid with its neighbor "tightens" the core during power operation and thereby inhibits bowing of one or more fuel assemblies in the core.

Resistance to bowing, however, is but one of a number of desirable performance characteristics of nuclear fuel assemblies relative to externally imposed lateral forces or loads. Such loads can arise during postulated seismic disturbances or loss of coolant accidents. Furthermore, localized contact between assemblies during normal operation can induce friction-induced wear.

Although vendors of nuclear steam supply systems have the opportunity to select materials and configurations for fuel assemblies by taking advantage of trade-offs with available margins in other core internals and performance parameters, such flexibility is not always available for suppliers of aftermarket reload fuel assemblies to be used with core internals and performance parameters originally designed by others. In designing reload fuel assemblies, it is usually preferable, if not necessary, to match or exceed coolant flow rates and strength characteristics of the grids on the original vendor's fuel assemblies. This objective is more difficult to achieve when the grids on the reload fuel assemblies are to be made of a material different from the grids of the original assemblies. In particular, if a reload fuel supplier desires to utilize grids made of Zircaloy, which has the advantage of relatively low parasitic absorption of neutrons in the core, the designer must compensate for the relatively weak structural strength of Zircaloy as compared to Inconel-718, which in the past has often been used as grid material in original fuel assemblies. Therefore, in order to match grid strength, conventional thinking dictates that the Zircaloy grid strips must be thicker or the intersection strip welds must be larger, both of which would cause higher pressure drops and mis-matched flow characteristics. Mis-matched flow characteristics may cause flow induced vibrations which could lead to mechanical failure due to fuel rod fretting, or thermal or heat transfer distribution problems.

Although Zircaloy grids with the optional back up springs described in the Anthony patent mentioned above can help prevent fuel assembly damage during a seismic event, the back up springs are disclosed only in the context of primary and secondary springs which have first "tightened up" the core.

SUMMARY OF THE INVENTION

It is, accordingly, an object of the present invention to provide a nuclear fuel assembly grid which can dissipate energy during postulated seismic or loss of coolant loading before its buckling or ultimate crush strength is reached.

It is a further object to provide a grid having interior strips and perimeter plates which are made of Zircaloy, yet exhibit sufficient tolerance of postulated seismic or loss of coolant loading to resist buckling or crushing to substantially the same degree as comparably sized grids made of a stronger material such as Inconel.

In accordance with the present invention, the grids of a nuclear fuel assembly include an outer strip, or perimeter plate, having outwardly projecting formations spaced from the side edges of the internal grid strips, for resiliently absorbing lateral forces before such forces are transferred directly to the internal strips. In other words, some motion of the perimeter plate occurs before the load is transferred directly to the internal strips.

In a particular implementation of the invention, the grid comprises a plurality of horizontally oriented, orthogonally intersecting metal strips, preferably Zircaloy, each having vertically oriented side edges. The strips are fixed to each other at the intersections to form a substantially rectangular rigid structure defining a plurality of cells or channels for receiving respective nuclear fuel rods. A perimeter plate horizontally spans each side of the rectangular structure. The perimeter plate has inwardly projecting formations which are rigidly attached to the side edges the strips, and outwardly projecting formations which are situated vertically above or below the attachments and spaced from the side edges of the strips. The outwardly projecting formations are thus resiliently supported by the inwardly projecting formations, for absorbing external loads imposed horizontally on the grid.

The load dissipating feature of the present invention can be enhanced by providing orifices in the substantially flat, central region of each perimeter plate. This produces an hydraulic damping effect that can be pre-established by selecting the orifice size for a given set of impact load conditions.

The grid perimeter plate in accordance with the present invention, can be attached to the side edges of the inner strips along a central region of the plate, with the outward projections formed at the vertically upper and lower regions of the plate. Preferably, these outward projections are defined by corrugations which form a convex surface that extends continuously along the horizontal dimension of the respective plate. Thus, the resilient "cushion" extends bilinearly along the upper and lower borders of each perimeter plate.

In a variation of this embodiment of present invention, the inwardly projecting formations are vertically oriented spring beams having integrally fixed upper and lower bases. These project from the central region of the perimeter plate, and are aligned with and welded to the side edges of the interior strips. The remainder of the central region acts as a supplement to the outwardly projecting corrugations in the border regions, to which the base of the springs is integrally attached, thereby enhancing the stiffness thereof.

In another embodiment, the upper and lower borders of the perimeter plate are relatively inward and secured to the interior strip side edges. The central region of the perimeter plate projects outwardly to provide the cushioning surface. Preferably, the projection in the central region is integrally supported by concave portions of corrugations at the upper and lower border regions.

An important advantage of the present invention is that the contact, or cushioning, surfaces of the perimeter plates have a relatively large area, for example as compared with the anti-bowing springs of the Anthony patent mentioned above. Since wear is influenced by sliding distance and surface pressure between wearing surfaces, an increase in the area subjected to rubbing causes the surface pressure between the two surfaces to be lower, resulting in a relative decrease in wear.

BRIEF DESCRIPTION OF THE DRAWINGS

These and other objects and advantages of the invention will be evident from the following description of the preferred embodiments, made with reference to the accompanying figures, in which.

DESCRIPTION OF THE PREFERRED EMBODIMENTS

So that the reader may understand the context of the present invention, FIGS. 1-3, which represent a conventional fuel assembly design, will first be described. This shows a typically fuel assembly 10 for a pressurized water nuclear power reactor, including a multiplicity of elongated fuel rods 12 spaced and supported in a rectangular, typically square array, by a plurality of longitudinally separated spacer grids 14 including one grid 16 at substantially the assembly mid plane. Each grid consists of orthogonally intersecting, or interlaced strips 30 forming an egg crate-type rigid structure which provides a plurality of four-walled channelled cells 31 through which the fuel rods traverse the grids. The grids 14,16 are affixed to support guide tubes 18 which extend longitudinally through the fuel assembly and are connected to lower end fittings 20 and upper end fittings 22 at the vertical extremities of the fuel assembly. The grids 14, 16, support guide tubes 18, and lower and upper end fittings 20, 22 define the structural frame of the assembly 10.

It should be appreciated that the particular dimensions of a fuel assembly, the number of cells in a grid, the size and number of support tubes, and the materials from which these structures are made, may vary from vendor to vendor in the nuclear power industry. Nevertheless, substantially all such assemblies are supported in the core at their upper and lower ends by relatively massive core internals. Thus, the mid elevation of each assembly at grid 16, is particularly susceptible to lateral impact from adjacent assemblies in the event of certain accidents, or from long term bowing, as depicted by the phantom lines 24 in FIG. 2.

Figure 1:
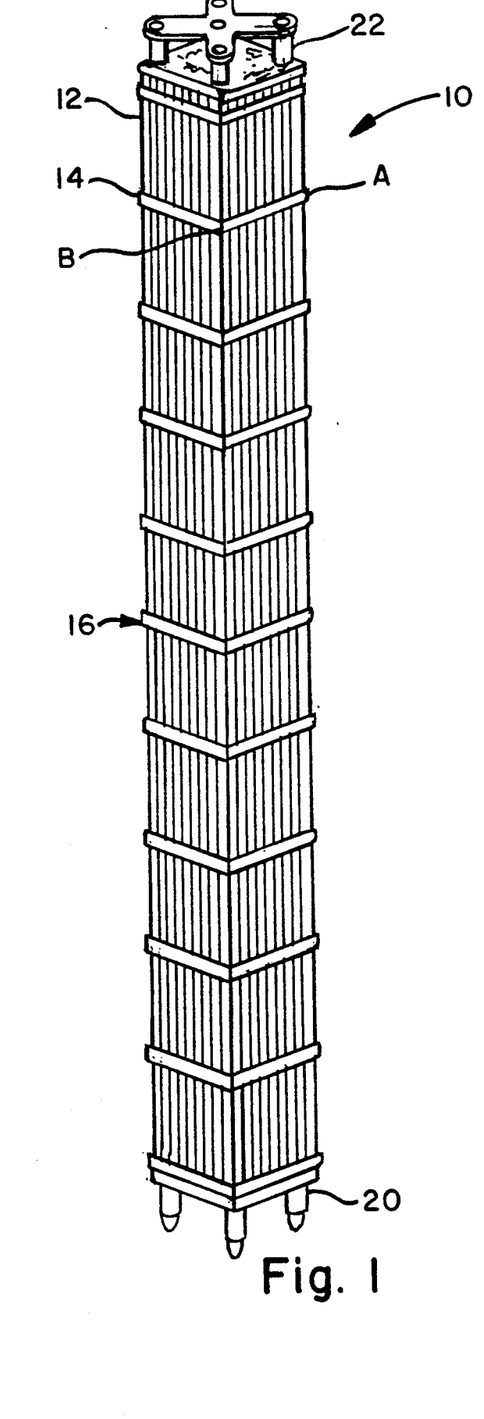
FIG. 1 is a schematic elevation view of a light water reactor nuclear fuel assembly.
Figure 2:
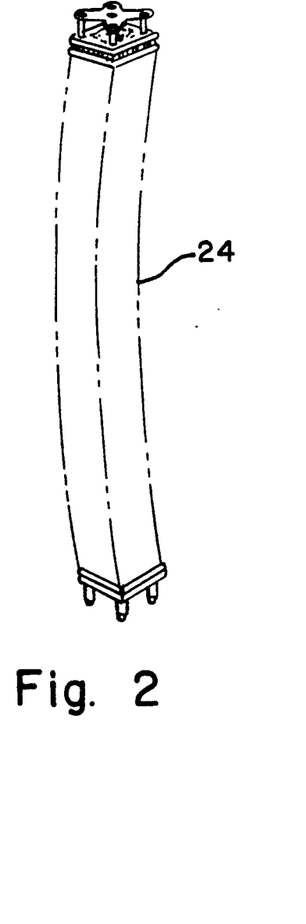
FIG. 2 is a schematic representation of the deformation of the assembly that could result from a seismic event, loss of coolant accident or bowing.

In a typical fuel assembly 10 of the type represented in FIGS. 1 and 2, each grid 14, 16 has a nominal cold outer dimension such that when the assemblies are arranged in a side-by-side array in a cold core, a nominal clearance, or gap exists between the grids of adjacent assemblies. Typically, four substantially flat perimeter plate section of segments 26 are angled or welded at their ends 28 to form the rectangular perimeter of the grids. The horizontally oriented, interlaced internal grid strips 30 are welded at their ends to the perimeter plates 26. The channel or cell walls defined by the strips typically include fuel support structure such as arches 32 and spring tabs 34. The inside surface 40 of the perimeter plate 26 may also include corresponding arches 36 and spring tabs 38 for spacing and supporting fuel rods in the outermost cells.

Figure 3:
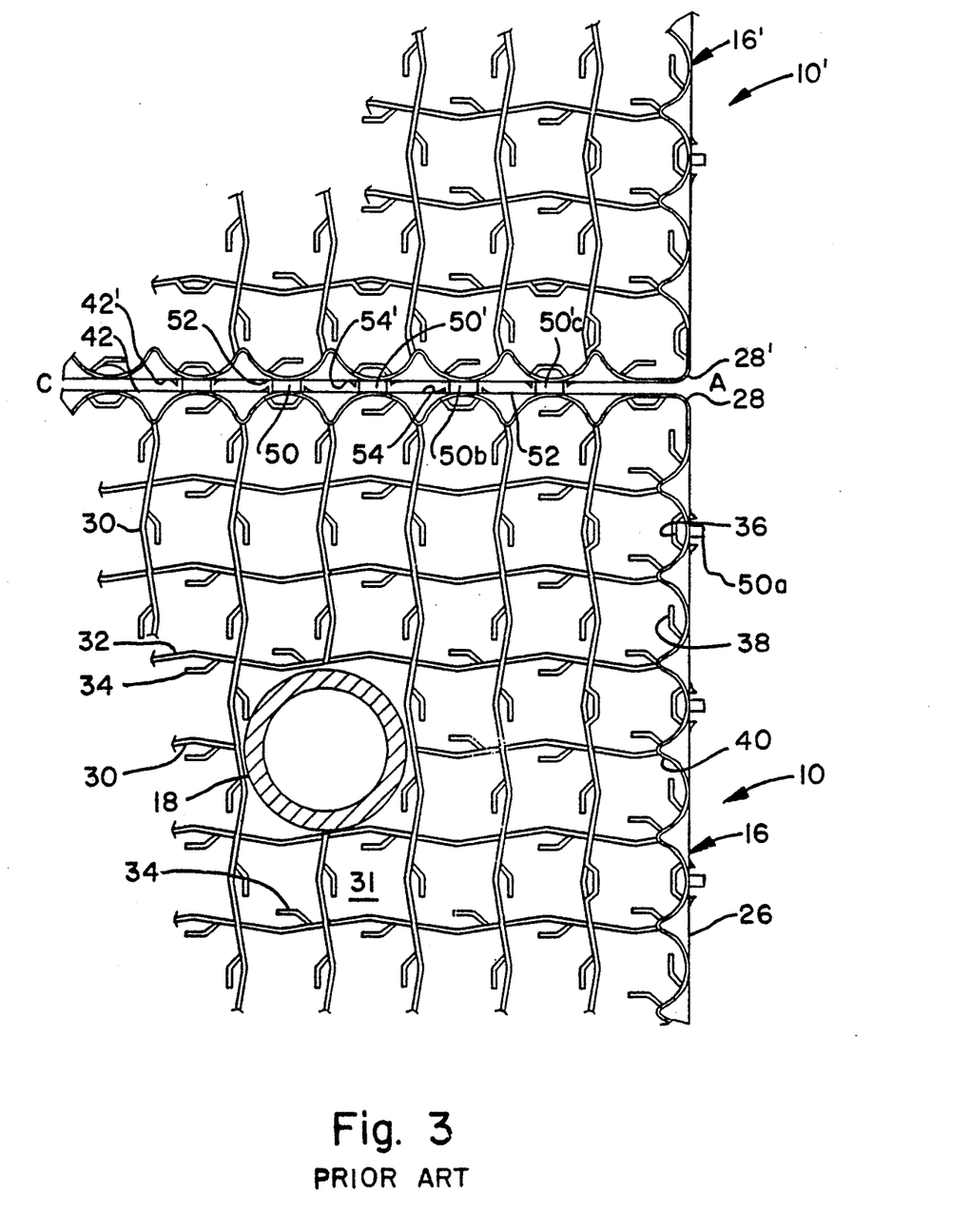
FIG. 3 is a plan view of portions of confronting grids on adjacent fuel assemblies of a type known in the prior art.

FIG. 3 also shows an adjacent assembly 10' including a grid 16' at the same elevation on the assembly as grid 16 is with respect to assembly 10. The oppositely facing grid outer surfaces 42, 42' are in coextensive, confronting relation and include, according to the Anthony patent mentioned above, a plurality of laterally spaced projections including primary springs 50, 50' and back up springs 54, 54'. Each primary spring 50 on grid 16 is in contact with a substantially flat portion 52 on the outer surface 42' of grid 16', and similarly the primary spring 50' of assembly 16' is in contact with a substantially flat surface 52 on grid 16.

Figures 4, 5:
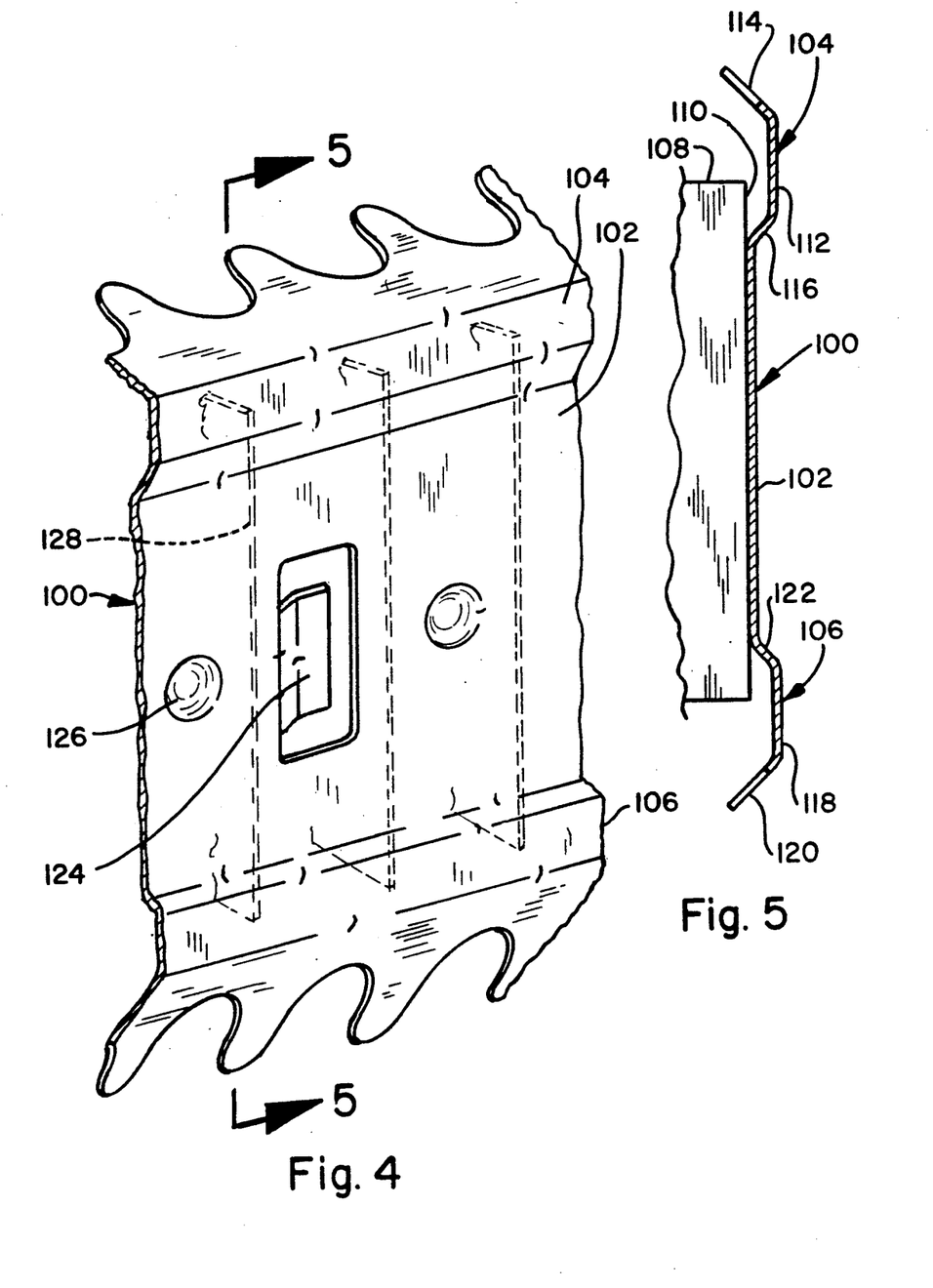
FIG. 4 is a perspective view of a portion of the perimeter plate of one embodiment of a grid in accordance with the present invention.
FIG. 5 is a sectional view of the perimeter plate shown in FIG. 4, taken along line 5—5 and showing the attachment of the perimeter plate to an interior strip.

FIG. 4 shows a first embodiment 100 of an improved perimeter plate that can be used with the internal strip arrangement and fuel assembly shown generally in FIGS. 1-3, but may also be used with other types of light water reactor assemblies. The plate 100 extends generally horizontally, as from A to B in FIG. 1, but only a portion of the horizontal dimension is evident in FIG. 4. The central region 102 of the plate is substantially flat, whereas the upper border 104 and lower border 106 are corrugated, as shown in FIG. 5. As viewed in FIG. 5, the plate 100 can be considered to have an inwardly projecting formation 102 rigidly attached to the side edges 110 of grid internal strips 108, and outwardly projecting formations 104 spaced from the side edges 110, whereby the outwardly projecting formations 104 are resiliently supported by the inwardly projecting formations 102 for absorbing external loads imposed horizontally on the grid. In the context of the present invention, "inwardly" and "outwardly" projecting should be understood as describing a characteristic that necessarily results from a plate having projections; some of the structure will be relatively "out" and some will be relatively "in".

It can be appreciated that each of the projecting borders 104, 106 horizontally spans the interior strips from A to B, and acts as a cantilevered beam. Relative to a continuous beam supported at both ends, a cantilever beam spring consisting of the same material, is sixteen times less stiff. Therefore, to obtain an overall stiffness comparable to that of a plurality of very small but stiff springs, such as disclosed in the Anthony patent, a relatively larger surface area is required. The increased size of the cantilevered border cushions 104,106, allows the surface area which comes into contact with other grids and/or the reactor internal structure to be much larger and, therefore, the contact pressure between wear surfaces and resulting wear, is reduced.

The upper and lower borders 104, 106 are preferably corrugated such that the maximum outward extent 112,118 of the convex border projections are flat or slightly crowned, and outwardly spaced from the side edges 110 of the strips 108. These surfaces 112, 118 are integrally connected by riser portions 116, 122, to the central region 102. The upper and lower limits or extremities of the plate 100, include edges 114,120 which turn back toward the strips 108 and preferably turn back over the strip edges 110, but at safe distances vertically above and below the vertical limits of the strips 108.

As shown in FIG. 4 the central region 102 of the plate 100 includes horizontally spaced apart spring tabs 124 or the like, which are integrally cut out of the metal and bent to project inwardly, into a cell, to support the fuel rod to be placed therein. Dimple structure or arches, can also be formed in the central regions, such as at 126, in alternation with the springs 124, With a similar purpose for supporting respective fuel rods. The vertically extending phantom line 128 indicates where the edges 110 of the grid strips 108 (see FIG. 5) are affixed to the hidden, flat area of the central region 102 of the perimeter plate 100, i.e., midway between the fuel rod support structure.

Figure 6:
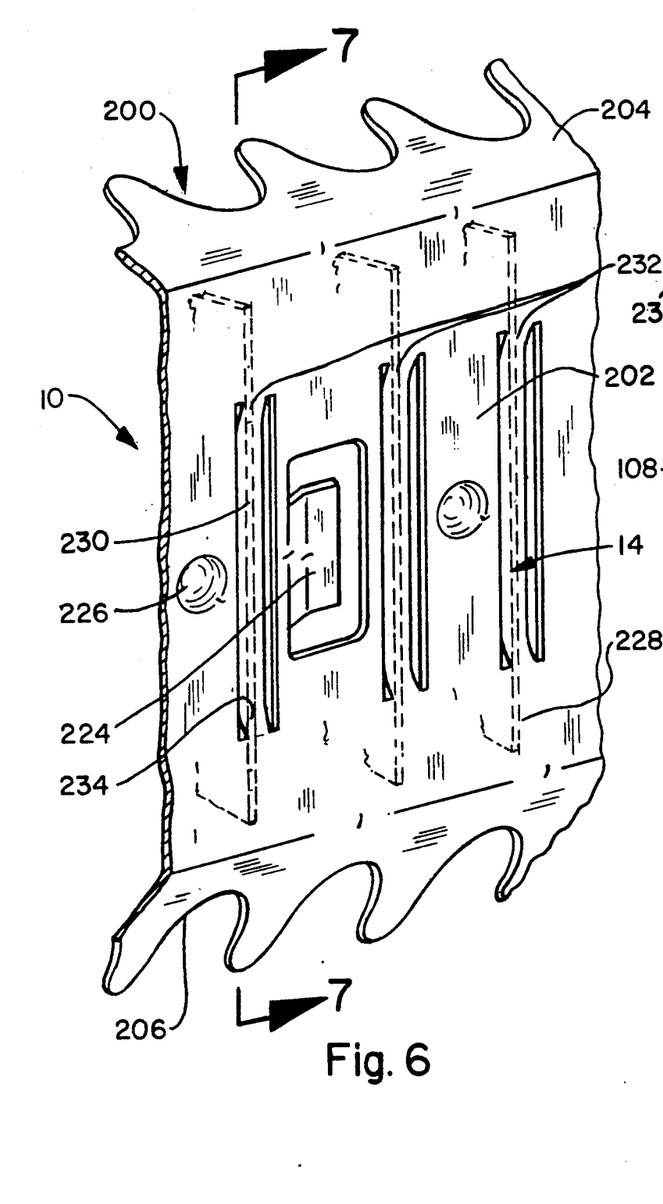
FIG. 6 is a perspective view of a second embodiment of a grid perimeter plate in accordance with the present invention.

FIG. 6 shows a second embodiment of the invention, wherein each perimeter plate 200 has a central region 202 and upper and lower border regions 204, 206. As shown in FIG. 6, the upper and lower border regions 204, 206 are simply bent inwardly toward the grid strips 108. The inwardly projecting structure 230 is on the central region 202, between successive fuel support structures 224, 226. The projecting members 230 are vertically oriented, continuous beams integrally supported at both ends, i.e., the respective upper and lower bases 232, 234 are integrally formed from the central region 202. The projecting formation 230 is substantially coextensive and vertically aligned along 228, with the respective edge of an interior strip.

Figure 7:
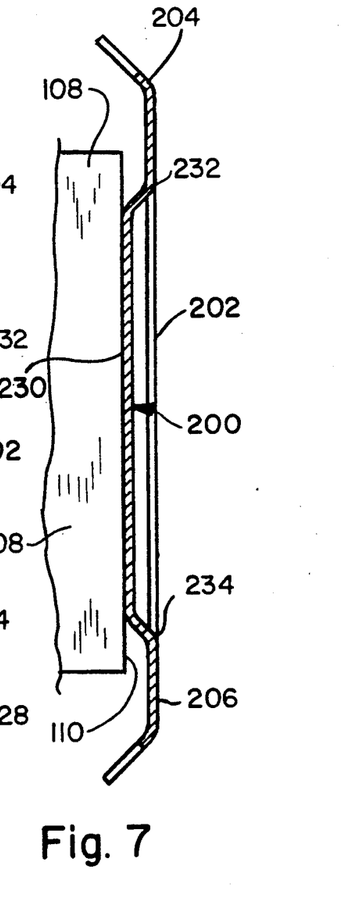
FIG. 7 is a section view similar to FIG. 5, taken along line 7—7 of FIG. 6.

FIG. 7 shows that in the embodiment of FIG. 6, the inward projections 230 serve as pedestals upon which the grid strips 108 are secured. The border formations 204, 206 are substantially parallel with the body of the central region 202. The body portion of the central region 202 is in essence projected outwardly to the same extent as the borders 204, 206, and thereby also spaced from the sides 110 of the grid strips 108. In this embodiment, the stiffness against lateral loading is determined by the strength and curvature in the inclined areas 232 and 234, at the interface of the border regions and the inward projections 230. However, the overall area that is spaced from the grid strip edge 110, for interacting with a confronting, similar perimeter plate (not shown), is quite large and therefore minimizes the potential for adverse wear deterioration.

Figure 8:
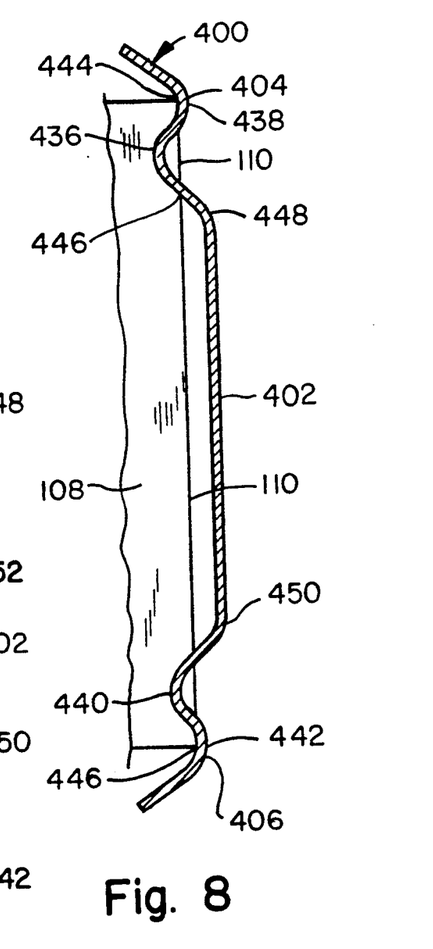
FIG. 8 is a section view similar to FIG. 5, showing a third embodiment of the invention.
Figure 9:
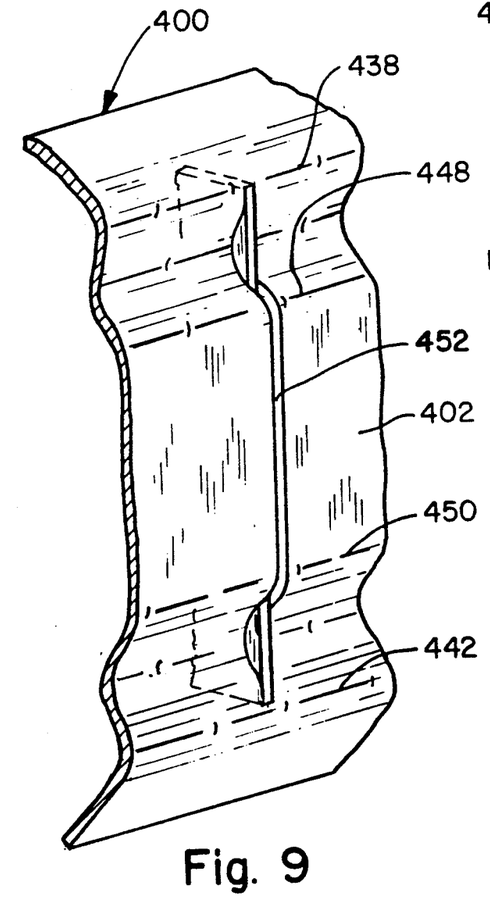
FIG. 9 is a front view of a portion of the perimeter plate of FIG. 8, showing a slot in the inwardly projecting portion of the perimeter plate.

FIGS. 8 and 9 show a third embodiment 400, in which the upper and lower border regions 404, 406 are generally formed so as to project inwardly, whereas the central region 402 projects outwardly, spaced from the side edge 110 of grid strip 108. As shown in FIG. 9, this embodiment preferably includes a slot 446 extending vertically through at least a portion of the upper and lower border regions 404,406 and, for convenience, through the entire vertical elevation of the inner region 402 at each horizontal position along the perimeter plate, where a strip 108 is to be attached. Whether or not the slot 452 passes through the inner region 402, the outwardly projecting surface 402 may be considered as substantially vertically above and below attachment points 446,444, respectively.

The upper and lower border regions 404, 406 are preferably corrugated in somewhat of an "S" shape, such that, as viewed externally of the grid, concave portions 436,440 are continuous with the central region, and convex portions 438, 442 are at approximately the same vertical elevations as the corners of the grid strips 108. Preferably, the corners of the grid strip abut the inside radii 444, 446, of the convex formations 438, 442, where they are welded. The slot 452 enables the side edge 110 of the grid strip 108 to pass through and overlap the concave portion 436, 440, such that these concave portions are free to move relative to the strip 108 as the central region 302 is loaded laterally.

Because of the particular spring configuration shown in FIGS. 8 and 9, a much greater grid stiffness can be designed compared to the cantilevered arrangement shown in FIGS. 4 and 5. The relatively large size of the cushioning, or energy absorbing area on the central region 402 between corners 448,450, minimizes wear in the event of rubbing against a confronting structure.

Figure 10:
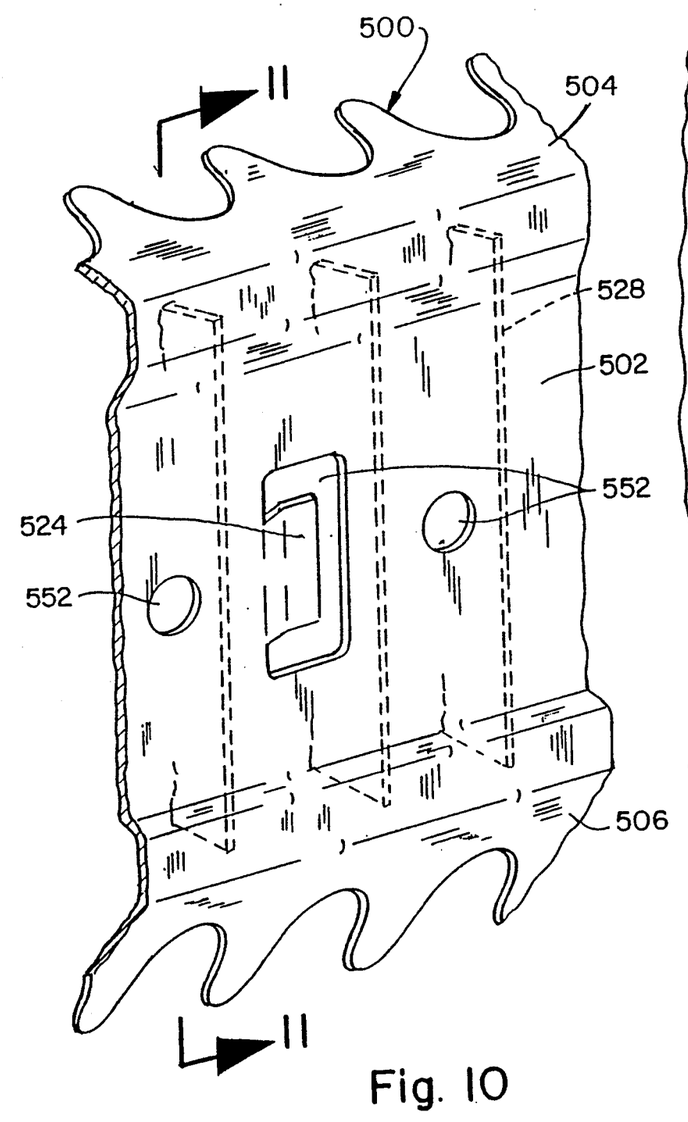
FIG. 10 is a perspective view similar to FIG. 4, showing a fourth embodiment of the invention.
Figure 11:
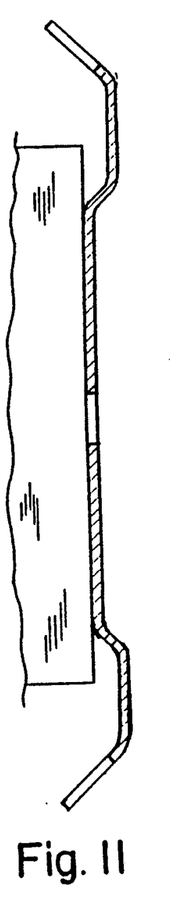
FIG. 11 is a section view similar to FIG. 5, taken along line 11—11 of FIG. 10.

FIG. 10 shows another preferred feature which can be incorporated into any of the previously described embodiments. The simplified perimeter strip 500 shown in FIG. 10 includes upper and lower border regions 504, 506, similar to those shown in FIG. 5. The central region 502 is also similar, in that the fuel rod support structure 524 is spaced apart horizontally at every other cell, and the grid strips are secured at their edges 110 just behind the phantom lines 528. In this embodiment, however, a plurality of orifices 552 are horizontally spaced apart, preferably in alternation with the spring tabs 524, so as to provide a hydraulic damper, thereby absorbing impact energy in combination with the bilinear laterally stiff border projections 504, 506. The cut out, open region around the cantilevered spring 524 also acts as an orifice to restrict coolant flowing through the plate as a confronting plate approaches during loading. The particular size of the orifices 552 can be predetermined based on the required damping conditions and expected loads and spring stiffnesses with which its performance must be matched. Thus, the borders 504, 506 are formed such that its material deflections and the hydraulic characteristics during postulated accident impacts dissipate and absorb energy. This will reduce the apparent impact loads which the grid structure will experience during the postulated accident.

The perimeter strip of the present invention not only resits impact loads, but is also effective in reducing fuel assembly bow and increasing flow in the outermost row of fuel rods. This is achieved without the necessity to "pre-tighten" the core. The outward projections for contacting an adjacent plate during lateral loading, preferably extend the full horizontal dimension of the plate, including locations that are substantially vertically above and/or below the attachments to the grid strips.

I claim:

1. A grid for a nuclear fuel assembly, comprising:

a plurality of horizontally oriented, orthogonally intersecting metal strips each having vertically oriented side edges, the strips being fixed to each other at the intersections to form a substantially rectangular rigid structure defining a plurality of four-walled channels for receiving respective nuclear fuel rods; and a perimeter plate horizontally spanning each side of the rectangular structure and having at least one inwardly projecting formation rigidly attached to the side edges of the strips and at least one outwardly projecting formation situated substantially vertically above or below the attachment of the inner formations to said side edges and spaced outwardly from said side edges, said outwardly projecting formation providing a large contact surface area, whereby the outwardly projecting formations are resiliently supported by the inwardly projecting formations for absorbing external loads imposed horizontally on the grid.

2. The grid of claim 1, wherein the perimeter plate has vertically upper and lower border regions and a central region between the border regions, the inwardly projecting formations are at the central region, and the outwardly projecting formations are at the border regions.

3. The grid of claim 1, wherein the perimeter plate has vertically upper and lower border regions and a central region between the border regions, the inwardly projecting formations are at the border regions, and the outwardly projecting formations are at the central region.

4. The grid of claim 2, wherein the central region includes horizontally spaced apart fuel rod support means that project inwardly into respective channels, and substantially flat areas between the fuel rod support means, said strip edges being fixed to the perimeter plates at the flat areas, and the border regions are cantilevered from the central region.

5. The grid of claim 4, wherein each border region includes a convex surface that extends continuously along the horizontal dimension of the respective plate.

6. The grid of claim 2, wherein the central region includes horizontally spaced apart fuel rod support means that project inwardly into respective channels, and horizontally spaced apart, vertically oriented beam spring means between the support means, which project inwardly, said beam spring means being integrally fixed to the border regions and attached to a respective strip edge.

7. The grid of claim 5, wherein the central region includes horizontally spaced apart fuel rod support means that project inwardly into respective channels, and horizontally spaced apart, vertically oriented beam spring means between the support means, which project inwardly, said beam spring means being integrally fixed to the border regions and attached to a respective strip edge.

8. The grid of claim 3, wherein the central region includes a convex beam spring surface that extends substantially continuously along the horizontal dimension of the respective plate.

9. The grid of claim 8, wherein the border is in the form of a corrugation spanning the horizontal dimension of the plate, the plate includes a plurality of vertical slots in the corrugations but terminating within the border regions, each edge of a strip intersects a corrugation at a slot such that the slot is free to move relative to the edge, and each edge is fixed to the border region at the termination of a respective slot.

10. The grid of claim 9, wherein the corrugation on each border region of a plate has a concave portion contiguous with the central region and overlapping the strip edge through said slot, and a convex portion to which the strip edges are fixed.

11. The grid of claim 1, wherein said outwardly projecting formation horizontally continuously spans the width of each side of the fuel assembly.

12. A nuclear fuel assembly of the type to be arranged adjacent a plurality of other similar fuel assemblies in the core of a nuclear reactor through which coolant is pumped, each fuel assembly having a plurality of vertically spaced apart grids for supporting fuel rods, wherein each grid comprises:

a plurality of horizontally oriented, orthogonally intersecting metal strips each having vertically oriented side edges, the strips being fixed to each other at the intersections to form a substantially rectangular rigid structure defining a plurality of four-walled cells for receiving respective nuclear fuel rods;

a perimeter plate horizontally spanning each side of the rectangular structure, the plate having a substantially flat central region and vertically upper and lower border regions, the central region being rigidly attached to the side edges of the strips and the border regions having outwardly projecting formations spaced from the side edges of the strips, whereby the outwardly projecting formations are resiliently supported by the central region for absorbing external loads imposed horizontally on the grid from contact with a confronting perimeter plate of an adjacent fuel assembly;

said central region including means projecting into adjacent cells for supporting a fuel rod, and a plurality of orifices spaced from the means for supporting a fuel rod, for restricting flow of coolant through the perimeter plate to induce a hydraulic damping effect as confronting perimeter plates contact each other along the respective border regions.

13. The fuel assembly of claim 12, wherein each border region defines a convex surface that extends continuously along the horizontal dimension of the respective plate.

14. The fuel assembly of claim 12, wherein the means for supporting a fuel rod include a cut-out which defines a cantilevered spring for contacting the rod, and an open region which supplements the orifices to restrict flow of coolant through the perimeter plate to induce a hydraulic damping effect as confronting perimeter plates contact each other.

* * * * *